US012197417B2

United States Patent
Singh et al.

(10) Patent No.: US 12,197,417 B2
(45) Date of Patent: *Jan. 14, 2025

(54) SYSTEM AND METHOD FOR CORRECTION OF A QUERY USING A REPLACEMENT PHRASE

(71) Applicant: SoundHound AI IP, LLC, Santa Clara, CA (US)

(72) Inventors: Pranav Singh, Sunnyvale, CA (US); Olivia Bettaglio, Santa Clara, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,846

(22) Filed: Jan. 21, 2022

(65) Prior Publication Data

US 2022/0147510 A1    May 12, 2022

Related U.S. Application Data

(63) Continuation of application No. 16/561,020, filed on Sep. 5, 2019, now Pat. No. 11,263,198.

(51) Int. Cl.
*G06F 16/23* (2019.01)
*G06F 16/2452* (2019.01)
*G06N 7/00* (2023.01)

(52) U.S. Cl.
CPC .... *G06F 16/2365* (2019.01); *G06F 16/24522* (2019.01); *G06N 7/00* (2013.01)

(58) Field of Classification Search
CPC ........... G06F 16/2365; G06F 16/24522; G06F 40/216; G06F 40/284; G06F 40/30;
(Continued)

(56) References Cited

U.S. PATENT DOCUMENTS

| 5,712,957 A | 1/1998 | Waibel et al. |
| 7,702,512 B2 | 4/2010 | Gopinath et al. |

(Continued)

FOREIGN PATENT DOCUMENTS

| JP | 2001228894 A | 8/2001 |
| JP | 2002182680 A | 6/2002 |

(Continued)

OTHER PUBLICATIONS

Erica Sadun, et al., Talking to Siri: Mastering the Language of Apple's Intelligent Assistant, Third Edition, March eo14, pp. 23-27.
(Continued)

*Primary Examiner* — Albert M Phillips, III
(74) *Attorney, Agent, or Firm* — Vierra Magen Marcus LLP

(57) ABSTRACT

Systems and methods are provided for natural language processing using neural network models and natural language virtual assistants. The system and method include receiving a natural language phrase including a word sequence, computing corresponding error probabilities that the words are errors, and for a word with a corresponding error probability above a threshold, then computing a replacement phrase with a low error probability to provide a response from the virtual assistant depending on the replacement phrase.

7 Claims, 12 Drawing Sheets

(58) Field of Classification Search
CPC .. G06F 40/35; G06N 7/00; G06N 5/04; G10L 15/01; G10L 15/183
See application file for complete search history.

(56) References Cited

U.S. PATENT DOCUMENTS

| | | |
|---|---|---|
| 8,660,849 B2 | 2/2014 | Gruber et al. |
| 9,953,637 B1 | 4/2018 | Fabbrizio et al. |
| 2003/0216912 A1 | 11/2003 | Chino |
| 2004/0024601 A1 | 2/2004 | Gopinath et al. |
| 2004/0225650 A1 | 11/2004 | Cooper et al. |
| 2005/0159950 A1 | 7/2005 | Roth et al. |
| 2006/0206337 A1 | 9/2006 | Paek et al. |
| 2007/0073540 A1 | 3/2007 | Hirakawa et al. |
| 2008/0052073 A1 | 2/2008 | Goto et al. |
| 2009/0125299 A1 | 5/2009 | Wang |
| 2009/0228273 A1 | 9/2009 | Wang et al. |
| 2009/0326938 A1 | 12/2009 | Marila et al. |
| 2010/0125458 A1 | 5/2010 | Franco et al. |
| 2010/0217598 A1 | 8/2010 | Adachi |
| 2011/0295897 A1 | 12/2011 | Gao et al. |
| 2012/0016678 A1 | 1/2012 | Gruber et al. |
| 2013/0179166 A1 | 7/2013 | Fujibayashi |
| 2013/0283168 A1 | 10/2013 | Brown et al. |
| 2014/0277735 A1 | 9/2014 | Breazeal |
| 2014/0310005 A1 | 10/2014 | Brown et al. |
| 2015/0039309 A1 | 2/2015 | Braho et al. |
| 2016/0063998 A1 | 3/2016 | Krishnamoorthy et al. |
| 2016/0253989 A1* | 9/2016 | Kuo ................ G10L 15/183 704/257 |
| 2016/0260436 A1 | 9/2016 | Lemay et al. |
| 2016/0267128 A1 | 9/2016 | Dumoulin et al. |
| 2017/0229120 A1 | 8/2017 | Engelhardt |
| 2018/0315415 A1 | 11/2018 | Mosley et al. |
| 2018/0342233 A1 | 11/2018 | Li et al. |
| 2019/0035385 A1 | 1/2019 | Lawson et al. |
| 2019/0035386 A1 | 1/2019 | Leeb et al. |

FOREIGN PATENT DOCUMENTS

| | | |
|---|---|---|
| JP | 2005241829 A | 9/2005 |
| JP | 2010044239 A | 2/2010 |
| JP | 2011002656 A | 1/2011 |
| WO | 2011028842 A2 | 3/2011 |
| WO | 2018083777 A1 | 5/2018 |
| WO | 2018160505 A1 | 9/2018 |
| WO | 2018217194 A1 | 11/2018 |

OTHER PUBLICATIONS

Griol, David et al. ; A framework for improving error detection and correction in spoken dialog systems; Group of Applied Artificial Intelligence (GIAA), Computer Science Department, Carlos III University of Madrid, Avda. de la Universidad, 30, 28911 Leganes, Spain; Published online: Jul. 29, 2016.

Laurent Prevot, A Sip of CoFee : A Sample of Interesting Productions of Conversational Feedback, Proceedings t>f the SIGDIAL 2015 Conference, pp. 149-153, Prague, Czech Republic, Sep. 2-4, 2015.

Levow, Gina-Anne; Characterizing and Recognizing Spoken Corrections in Human-Computer Dialogue; MIT AI Laboratory Room 769, 545 Technology Sq. Cambridge, MA 02139.

Matthias Scheutz, Robust Natural Language Dialogues for Instruction Tasks, Proceedings of SPIE, 2010.

Omar Zia Khan, Making Personal Digital Assistants Aware of What They Do Not Know, Interspeech, ISCA, Jul. 22, eo16.

RA Veesh Meena, Data-driven Methods for Spoken Dialogue Systems, Doctoral Thesis, KTH Royal Institute of rechnology, School of Computer Science and Communication, Department of Speech, Music and Hearing, 100 44 Stockholm, Sweden, Feb. 2016.

* cited by examiner

SYSTEM AND METHOD FOR CORRECTION OF A QUERY USING A REPLACEMENT PHRASE

CROSS REFERENCE TO RELATED APPLICATION

This application is a continuation of U.S. application Ser. No. 16/561,020 filed on Sep. 5, 2019 titled SYSTEM AND METHOD FOR DETECTION AND CORRECTION OF A QUERY by Olivia BETTAGLIO, et al., the entire disclosure of which incorporated herein by reference.

TECHNICAL FIELD

The present invention is in the field of systems with speech recognition capability, natural language understanding capability, or both, and more specifically, related to systems and methods for identifying errors by a user's repetition of a similar query.

BACKGROUND

Conventional systems fail to detect when a question answering system gives a bad answer to a user's query. In particular, automatic speech recognition (ASR) based systems fail to detect errors in the speech recognition. This results in getting transcriptions wrong. Additionally, natural language understanding (NLU) based systems fail to detect errors in query interpretations. Furthermore, even if a system could detect errors, it is impossible to predict a correction for a wrongly transcribed or wrongly interpreted phrase (one or more tokens).

Therefore, what is needed is a system and method for systematically identifying queries that result in incorrect/inaccurate/incomplete transcription by ASR systems and NLU systems, which result in response errors due to missed/incorrect conversion of speech to a transcription or misinterpretation, both of which result in a negative user experience.

SUMMARY

Systems and methods are provided for systematically finding and fixing queries that often result in incorrect ASR system errors due to missed conversion of speech to a transcription or misinterpretation, both of which result in a negative user experience when using a question answering system.

In accordance with one embodiment a system includes Automatic Speech Recognition (ASR) that performs speech recognition and converts speech to a transcription. The system captures speech audio, performs speech recognition on the segment of speech audio, and performs natural language understanding of the spoken words using techniques such as comparing the words to grammar rules. The system, through a network, communicates with an application.

There are various advantages of the invention. One advantage of the invention is a seamless integration of an application with a system having a user interface with which the user is already familiar. Another advantage of the invention is the ability to expand the functionality of an application after the application is built or deployed for use by a user. A further advantage of the invention includes the ability to interface with an application, through a network, using a variety of input means, such as a speecrophone for a user interface.

DETAILED DESCRIPTION

All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," or similar language means that a particular aspect, feature, structure, or characteristic described in connection with the embodiment is included in at least one embodiment. Thus, appearances of the phrases "in one embodiment," "in at least one embodiment," "in an embodiment," "in certain embodiments," and similar language throughout this specification may, but do not necessarily, all refer to the same embodiment or similar embodiments.

Embodiments of the invention described herein are merely exemplary, and should not be construed as limiting the scope or spirit of the invention as it could be appreciated by those of ordinary skill in the art. The disclosed invention is effectively made or used in any embodiment that comprises any novel aspect described herein. Furthermore, to the extent that the terms "including", "includes", "having", "has", "with", or variants thereof are used in either the detailed description and the claims, such terms are intended to be inclusive in a similar manner to the term "comprising".

Figure 1A:
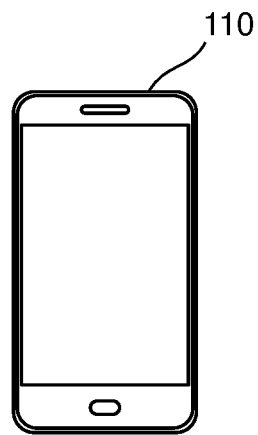
FIG. 1A shows a speech-enabled device according to various embodiments of the invention.
Figure 1B:
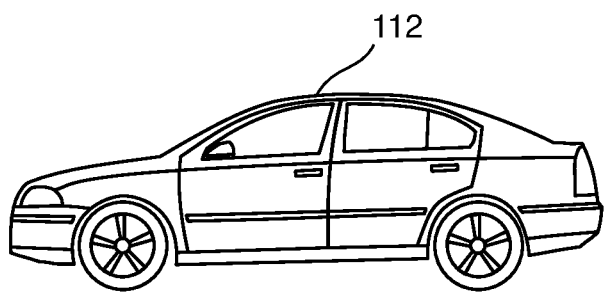
FIG. 1B shows a speech-enabled device according to various embodiments of the invention.
Figure 1C:
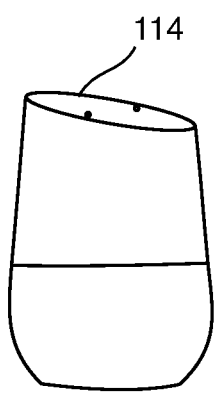
FIG. 1C shows a speech-enabled device according to various embodiments of the invention.
Figure 1D:
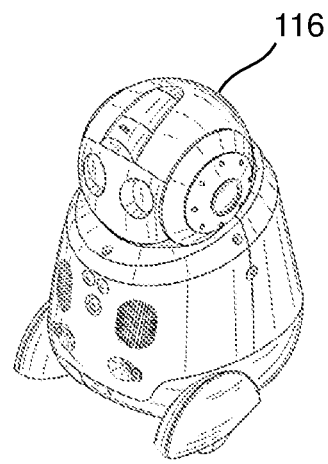
FIG. 1D shows a speech-enabled device according to various embodiments of the invention.

A query response system (QRS) receives queries from a user and provides responses to those queries. One embodiment of a QRS is any virtual assistant (or any machine) that assists a user and, in most instances, that the user can control using speech. FIGS. 1A, 1B, 1C, and 1D show example embodiments of speech-enabled virtual assistants according to different embodiments of the invention. FIG. 1A shows a mobile phone 110. FIG. 1B shows an automobile 112 that includes a speech enable virtual assistant. FIG. 1C shows a countertop speecrophone 114, which is capable of playing music in response to a query from the user. FIG. 1D shows a domestic robot or a personal electronic butler 116, which includes a microphone and speaker and the ability to receive queries and commands from the user, provide a response to the queries and commands, and perform actions in response to the queries and commands from the user.

Some embodiments of a virtual assistant are screenless, such as an earpiece that includes a microphone and speaker, and which has no display screen. Some embodiments of a virtual assistant are stationary, such as a vending machine that includes a speaker and a microphone. Some embodiments of a virtual assistant are portable, such as a mobile phone. Some embodiments of a virtual assistant include a manual interface, such as keyboard or touchscreen. Some embodiments of a virtual assistant include neural interfaces that use human thoughts as a form of natural language expression. Some embodiments of a virtual assistant are a home personal assistant device.

In accordance with the various aspects of the invention, some embodiments function by running software on general-purpose programmable processors. In accordance with some embodiments, which are power-sensitive, and some embodiments that require especially high performance for neural network algorithms use hardware optimizations. Some embodiments use application-customizable configurable processors in specialized systems-on-chip, such as ARC processors from Synopsys and Xtensa processors from Cadence. Some embodiments use dedicated hardware blocks burned into field programmable gate arrays (FPGAs). Some embodiments use arrays of graphics processing units (GPUs). Some embodiments use application-specific-integrated circuits (ASICs) with customized logic to give best performance. Hardware blocks and custom processor instructions, co-processors, and hardware accelerators perform neural network processing or parts of neural network processing algorithms with particularly high performance and power efficiency. This is important for maximizing battery life of battery-powered devices and reducing heat removal costs in data centers that serve many client devices simultaneously.

Referring again to FIG. 1A, one example embodiment, in accordance with the invention, of a virtual assistant is a mobile phone running an application that can provide responses to queries or questions. Other examples include a speech-enabled household appliance, a watch, an automobile, a robot that performs laborious tasks, and an implanted bodily enhancement device.

Virtual assistants receive commands from users. In response to commands, virtual assistants perform responsive actions that produce responsive results. In accordance with various embodiments of the invention, some virtual assistants include applications that have the ability to store grammar or grammar rules. As used herein "grammar" includes a set of one or more phrasing rules, which may be related to a domain of conversation. Each rule defines a phrasing that indicates or represents a particular meaning and may result in a task being performed by the application. The phrasing is typically in natural language and spoken by a user. The grammar or grammar rule includes functional information that an application recognizes and that acts as control information that the application uses to perform a task or action. The grammar also includes information for execution by the application, the execution of which results in a response from the application. In accordance with another embodiment, a grammar is stored in a remote location and accessed as needed. For example, a grammar rule may support the phrasing "what's the weather," which is natural language, and the grammar rule causes a request to look up the weather report. A grammar "what's the weather in <PLACE NAME>" is a grammar rule that means a request to look up the weather report for whatever PLACE NAME a speaker utters.

An action of a virtual assistant that answers questions is to provide an answer as a result. Users observe/hear the result from the virtual assistant, which is intended to be responsive to the user's commands or query. In accordance with some embodiments, virtual assistants provide the answer result as synthesized speech. In accordance with some embodiments, the response from the virtual assistant may be confirmation of an action to be performed by the virtual assistant.

Figure 2:
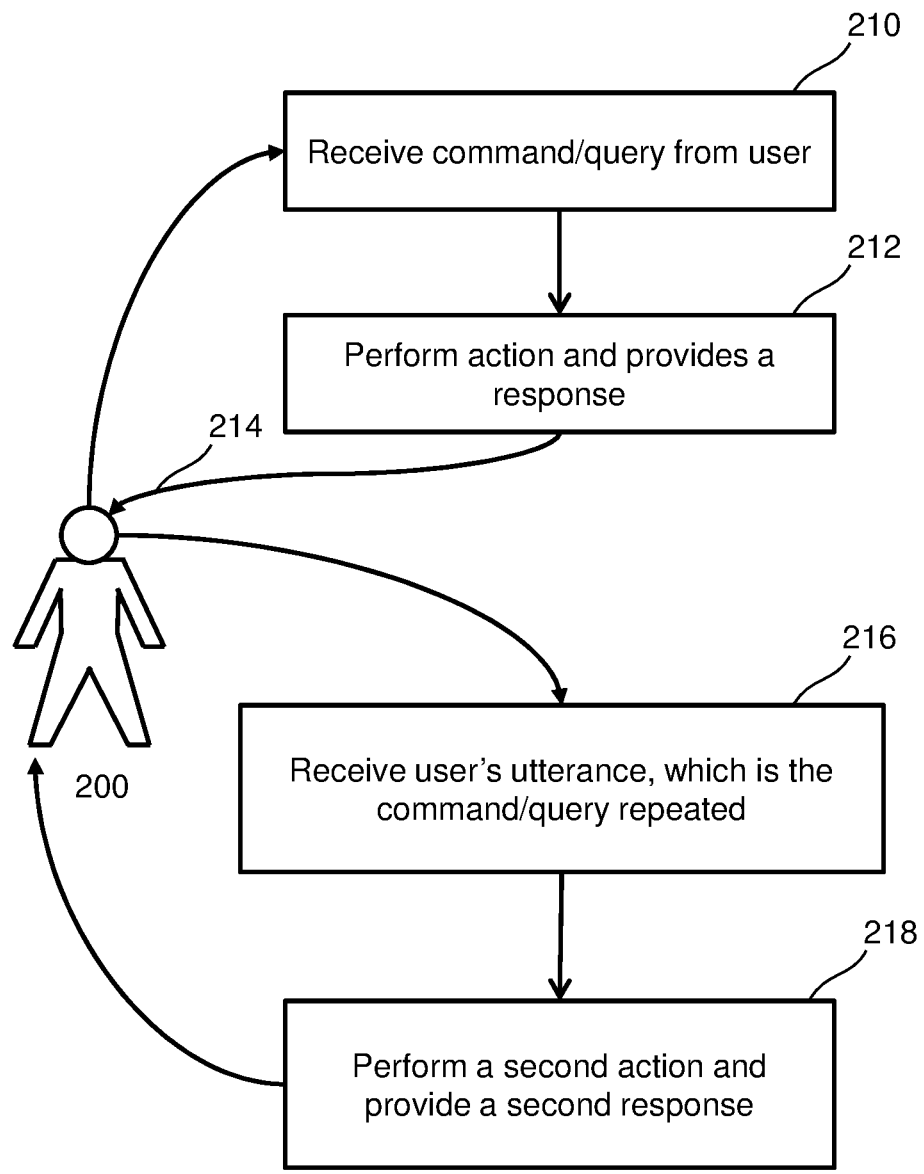
FIG. 2 shows a user interacting with a system that uses natural language to respond to the user according to an embodiment of the invention.

Referring now to FIG. 2, a user 200 is shown. In accordance with various embodiments, the virtual assistant receives speech or text queries from the user, such as audio captured by one or more microphones. The virtual assistant recognizes words using speech recognition. Many methods of speech recognition are known in the art and applicable to the various aspects and embodiments of the invention. The user queries (sends a command to) the virtual assistant (or QRS). At 210, the virtual assistant receives the command or query. In accordance with some embodiments, the virtual assistant performs actions and provides responses. At 212, the virtual assistant performs the action, as understood, and provides a response 214 to the user's query based on a transcription and interpretation derived from the query.

Users can feel satisfied with the results from their commands, dissatisfied with the results, or neutral about the results. In accordance with various embodiments of the invention, the virtual assistant determines if the response provided to the user is satisfactory. Thus, the virtual assistant attempts to determine if the response was accurate, or responsive, based on the user's reaction. In some instances, the user is not satisfied with the response, either because of transcription error, interpretation error, or lack of expected system capability. When the user is not satisfied, the user may indicate this by using a negative indicator. Negative indicator words are words that, in some context, indicate that a previous action performed by a virtual assistant was unsatisfactory. In particular, the action that the virtual assistant performed is one that did not satisfy its user. For example, the word "no" can be a negative indicator since it is a likely user utterance if a virtual assistant says "the sky is green". The word "stop" can be a negative indicator since it is a likely user utterance if a voice-enabled automobile starts opening its windows when a passenger asks to turn on the heat. Different virtual assistants have different sets of negative indicator words. For example, although the word "stop" is a negative indicator for a car, "stop" is a normal command for a music player. Words, as recognized by speech recognition, are sequences of phonemes available in a dictionary. Transcriptions are sequences of words.

In some instances, when a user is not satisfied with the response, the user will almost immediately provide a second query that is similar, but not identical to the first query. In accordance with some aspects of the invention, the user repeats the same query. For example, if a user asks a question and gets a bad answer, then at 216, the user is likely to repeat the question almost immediately in order to get the correct transcription before giving up. At 218, the virtual assistant performs a second action and provides a second response.

In accordance with one aspect of the invention, if there is a transcription error, then an example of an exchange between the user and the virtual assistant might be as follows when the user intends the query: Show me the hiking options near Yosemite. The virtual assistant captures the user's spoken query. The transcription results in the virtual assistant transcribing the user's query to be: "Show me the hiking options near unity." The word "unity" is phonetically similar to the user's intended word "Yosemite." A response to this query, which is due to incorrect transcription, from the virtual assistant would be incorrect. As such, the user would most likely almost immediately repeat the query. In some instances, the user may even interrupt the response from the virtual assistant in order to repeat the query. The virtual assistant captures the second user query, which is the same as the first query. This may result in the correct transcription. In accordance with some aspects, another incorrect transcription may result in the virtual assistant understanding the query to be: "Show me the hiking options near and me." Again, a response, which is to the incorrectly transcribed query, from the virtual assistant is incorrect. The process may again be repeated, as the user repeats the original query a third time or even a fourth time. In accordance with some aspects of the invention, the user may decide to provide the query in a text or typed format. When the virtual assistant transcribes the query correctly and understand it to be "Show me the hiking options near Yosemite" the response from the virtual assistant will be satisfactory to the user. The virtual assistant can compare the various transcriptions to determine that the transcriptions were incorrect or inaccurate. The virtual assistant can use the information collected to improve responses to future queries. In accordance with some embodiments, the virtual assistant provides the information to a database for collection and analysis, as outline below.

Figure 3:
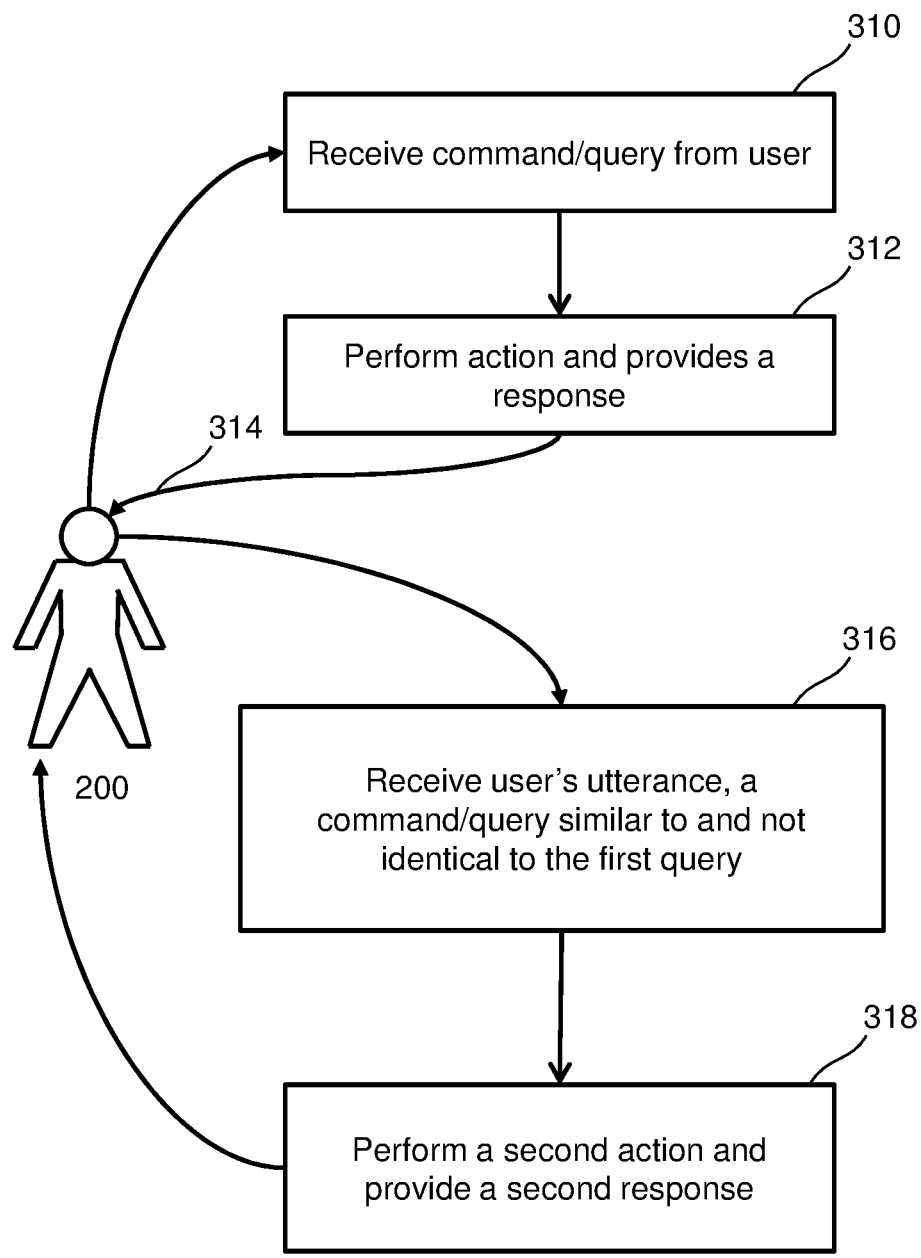
FIG. 3 shows a user interacting with a system that uses natural language to respond to the user according to an embodiment of the invention.

Referring now to FIG. 3. the user 200 is shown interacting with the virtual assistant or the QRS. At 310, the virtual assistant receives the command or query. In accordance with some aspects of the invention, the virtual assistant can incorrectly interpret the query from the user. At 312, the virtual assistant performs the action, as interpreted, and provides a response 314 to the user's query based on the interpretation of the query. In some instances, the user does not repeat the same query when the virtual assistant provides an incorrect response to the user's query. Instead the user changes the query that is received by the system, at 316. For example, the user may provide the query: "What are the FIFA matches gonna happen today?" The virtual assistant may transcribe the query correctly and provide an inaccurate or incorrect response. The user may then provide the following query: "Show me the list of FIFA matches scheduled for today." At 318, the virtual assistant performs a second action and provides a second query. Another example of a follow-up query may be: "Who is playing in the FIFA today?" The user may follow-up with a general query: "Any FIFA matches today?" Any of the follow-up, and different queries, can be in response to the virtual assistant (or system) providing an inaccurate response or an incorrect response because of misinterpretations. Even if all transcriptions are correct for the user's successive queries, they are significantly different in length and words used. In other words, they have a large edit distance. However, they all have the same or similar semantic meanings. The failure of the virtual assistant to interpret the first query might be because it lacks a grammar or other appropriate training that supports the phrasing.

Figure 4:
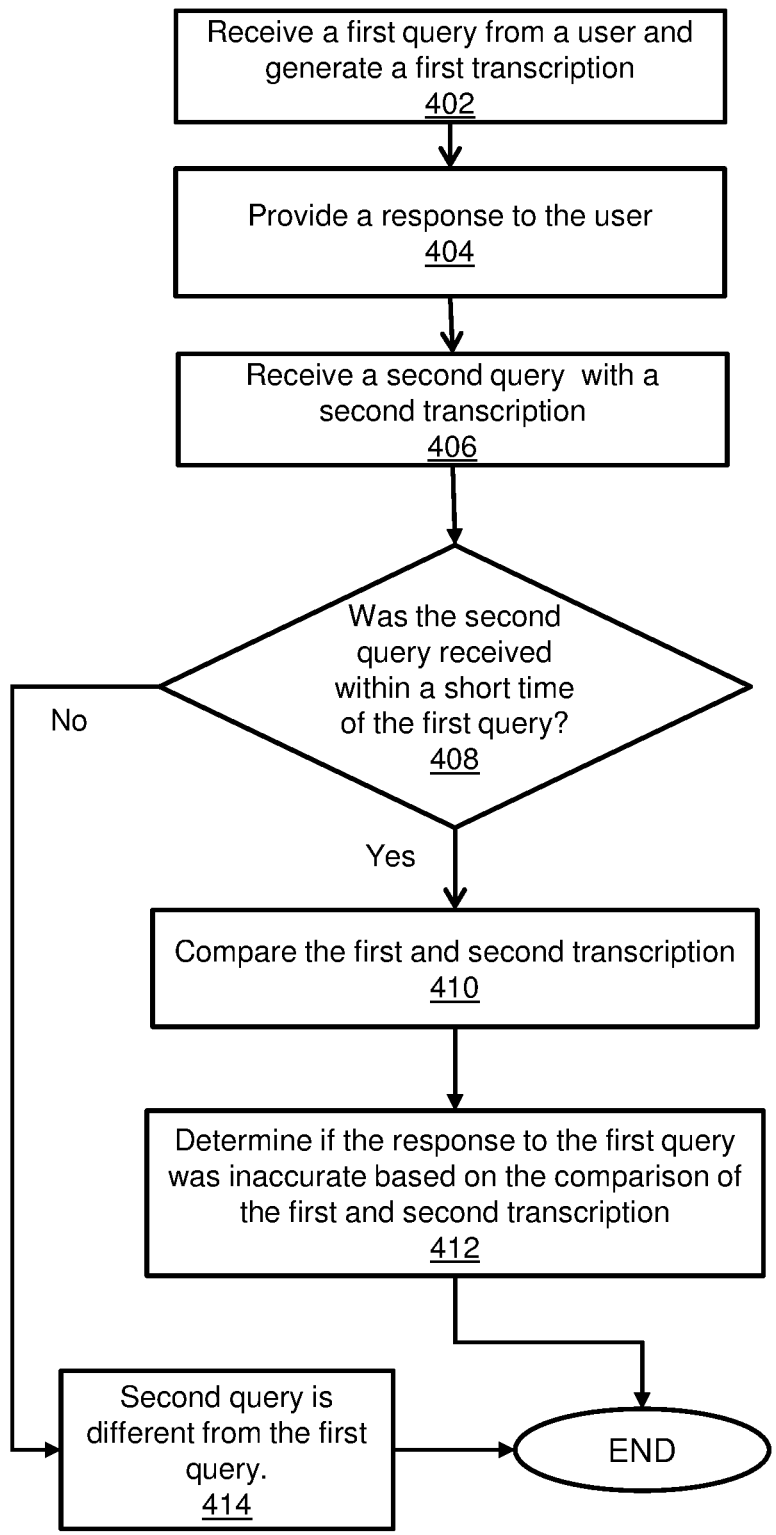
FIG. 4 shows a process for determining an incorrect response from a system according to an embodiment of the invention.

Referring now to FIG. 4, a process is shown for a system that responds to a user's query. At step 402, the system receives a first query for the user. The system generates a first transcription from the first query. At step 404, the system provides a response to the user. If the first transcription was incorrect, then the response will not be satisfactory to the user. At step 406, the user queries the system a second time by providing a second query. The second query results in a second transcription. At step 408, the system determines if the second query was received within a short period of time from the first query. In accordance with one aspect of the invention, a short period is within the range of 0-30 seconds after completion of the first query. If so, then at step 410 the system compares the first transcription with the second transcription. At step 412, the system determines if the response to the first query was inaccurate based on comparison of the first transcription and the second transcription. The comparison computes a measure of similarity between the first transcription and the second transcription, as described in detail below. If at step 408 the second query was not within a short period of time from the first query, then at step 414 the system determines that the queries are unrelated and so the second query cannot indicate an error in the first query's transcription.

Figure 5:
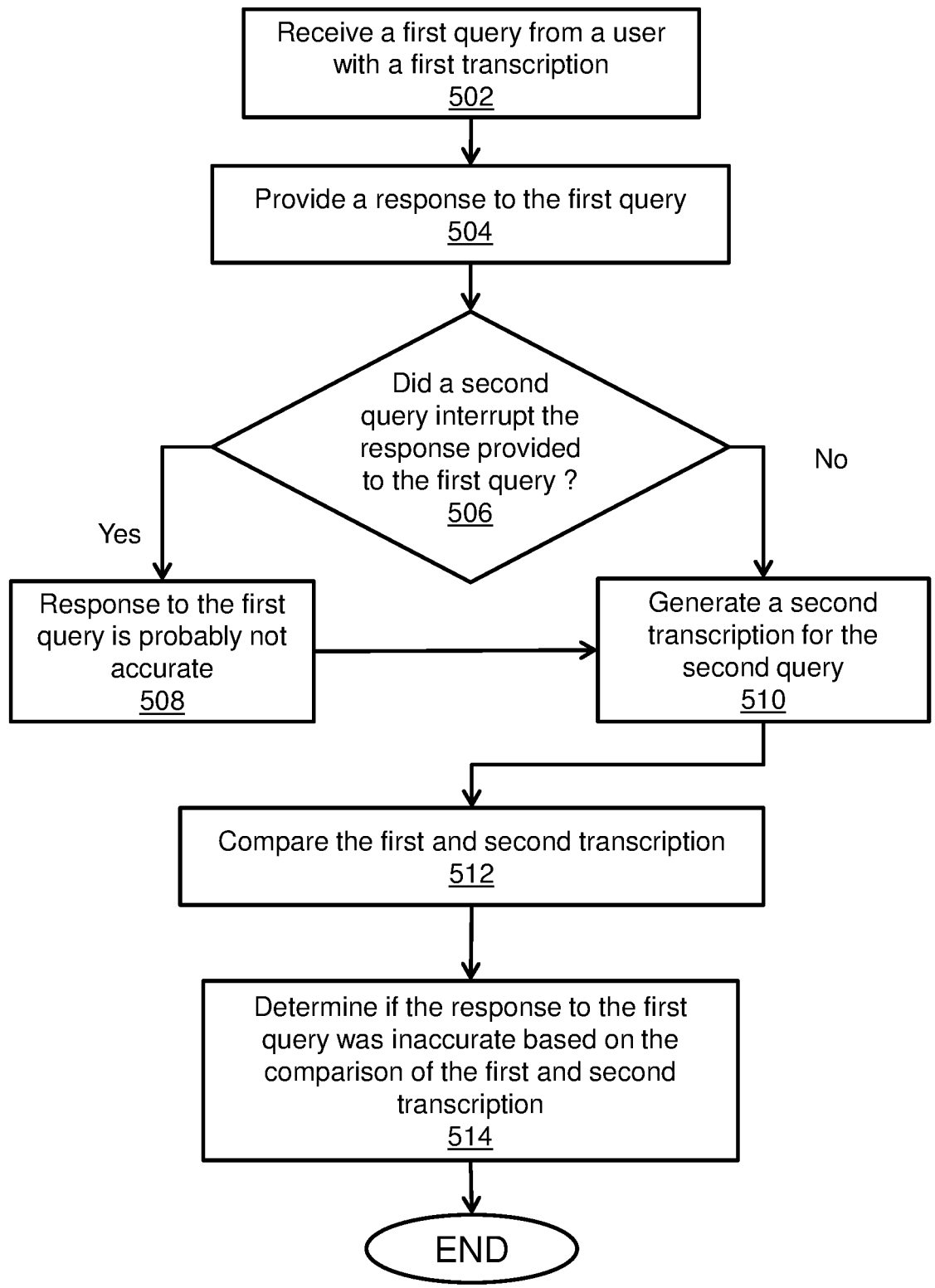
FIG. 5 shows a process for determining an incorrect response from a system with an interruption query according to an embodiment of the invention.

Referring to FIG. 5, a process for determining an incorrect response is shown in accordance with the various aspects of the invention. At step 502, the system receives a first query for the user. The system processes the first query and generates a first transcription. At step 504, the system provides to the user a response to the first query based on the first transcription. If the first transcription was incorrect, then the response will not be satisfactory to the user. At step 506, the system determines if the user provided a second query that interrupted or barged-in during the response. If so, then at step 508 the system determines that the response was probably not accurate. Accordingly, the system can mark or tag or designate the first transcription as not being accurate. If at step 506 the second query did not interrupt the response, then at step 510, the system generates a second transcription for the second query. In accordance with one aspect of the invention, the second query is identical to the first query. In accordance with one aspect of the invention, the second query is similar to, but not identical to, the first query. At step 512, the system compares the first transcription with the second transcription. At step 514, the system determines if the response to the first query was inaccurate based on comparison of the first transcription and the second transcription.

Figure 6:
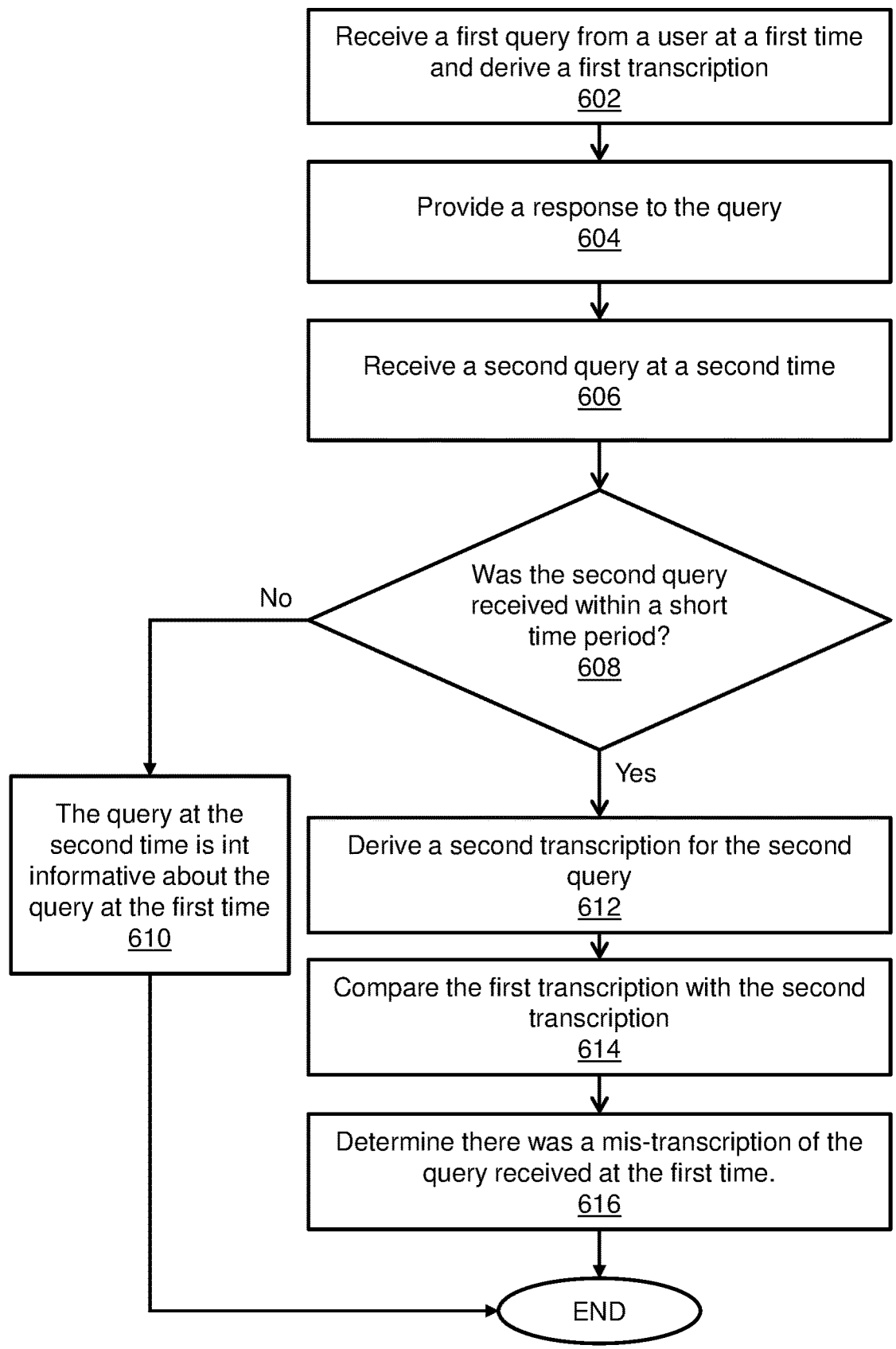
FIG. 6 shows a process for determining an incorrect response to a repeated query according to an embodiment of the invention.

Referring now to FIG. 6, a process for determining an incorrect response is shown in accordance with the various aspects of the invention. At step 602, a system receives a first query at a first time and derives a first transcription for the first query. At step 604, the system provides a response to the query based on the first transcription. At step 606, the system receives a second query at a second time. In accordance with some aspects of the invention, the second query may be the similar to the first query. In accordance with some aspects of the invention, the second query may be identical to the first query. At step 608, the system determines if the second query was received a short period of time after the first query. If the second query was not received a short period of time after the first query, then at step 610 the system can determine that the second query is not useful to indicate the correctness or accuracy of the response to the first query. If at step 608 the system determines that the time span between the query at the first time and the query at the second time is a short duration, which is less than 30 seconds, then at step 612 the system derives a second transcription for the second query. At step 614, the system compares the first transcription with the second transcription. The system compares the similarity between the first and second transcriptions. If the similarity is above a threshold, then the system determines that the queries are similar. The similarity of the queries can be calculated using, for example, edit distance. In light of the queries being presented within a short period of time and the queries being similar, then, at step 616, the system determines that there was a mistranscription of the first query. Thus, the system determines that the response to the query at the first time was an incorrect response and the first transcription was incorrect or a misinterpretation.

Figure 7:
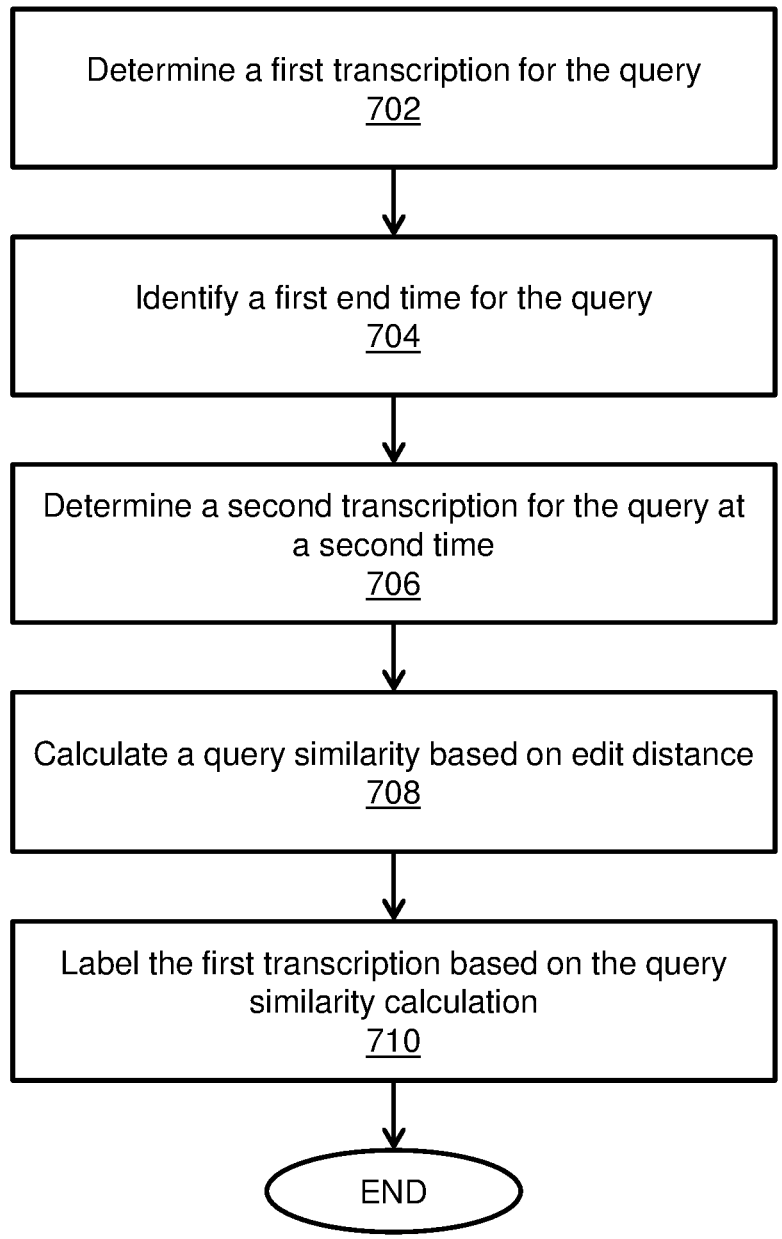
FIG. 7 shows a process for determining an incorrect response to a repeated query according to an embodiment of the invention.

Referring now to FIG. 7, a process is shown for labeling transcriptions. At step 702, a system determines a first transcription for a query. At step 704, a first end time is determined for the query. At step 706, a second transcription is determined for a query at a second time. At step 708, the system calculates a query similarity between the first transcription and the second transcription based on edit distance. The query similarity includes edit distance and timing of the queries, which is based on the first end time of the query and the start time of an immediately following query. If the edit distance is low and the time period between queries is short, for example less than 30 seconds, then the similarity score for the queries would be high, which exceeds a defined threshold value. Based on the threshold value being exceeded, at step 710, the first transcription is labelled or tagged according to the query similarity calculations.

Using the labelled transcription, a model is trained to determine when two queries, that are presented in a short period of time, are provided by a user due to inaccurate responses generated by the system. This allows the system to detect incorrect transcriptions or interpretations as well as learn to correct the error. Furthermore, entity tagging improves the amount of data available and therefore the accuracy of training a system for detection and correction.

Figure 8:
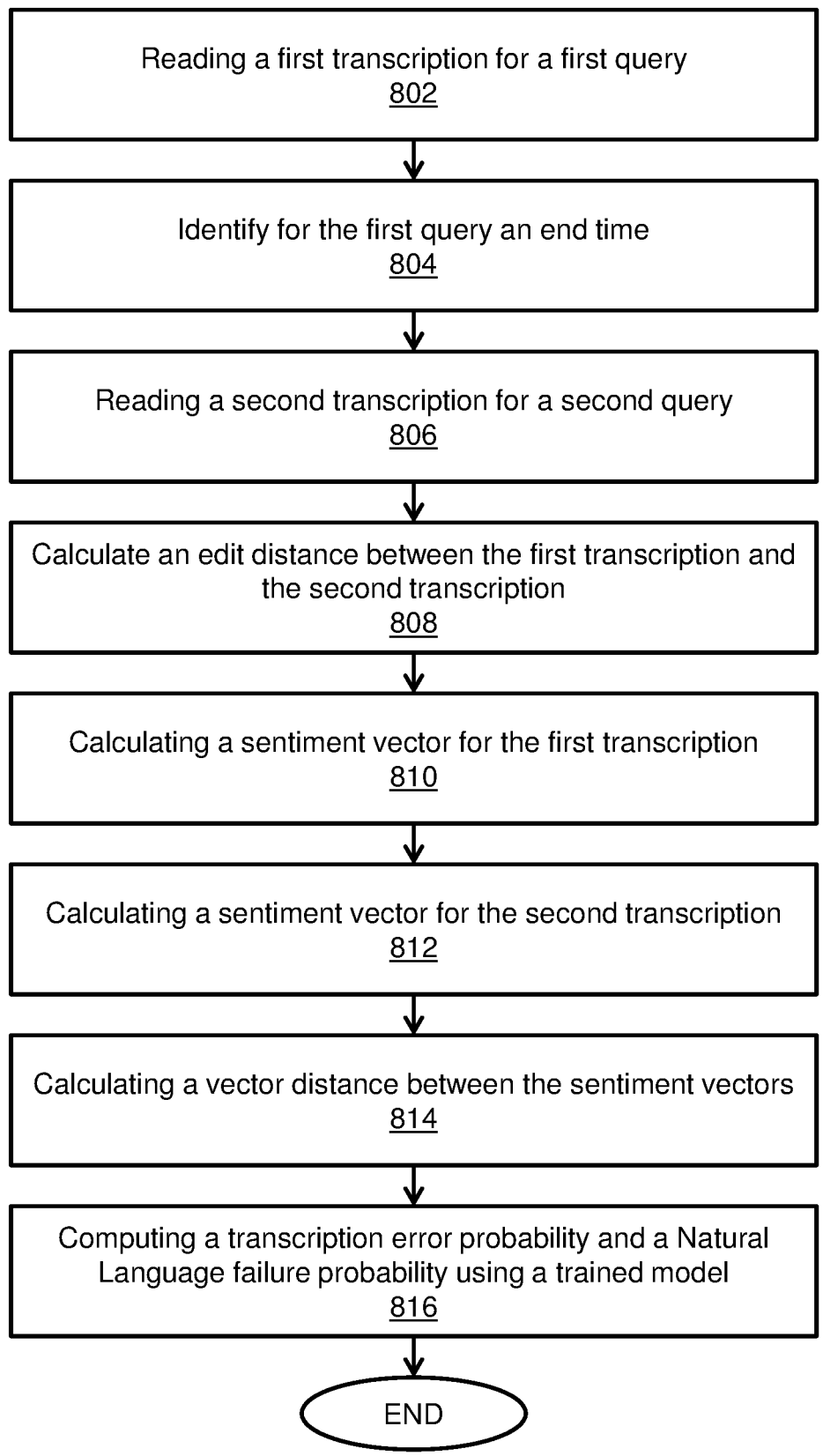
FIG. 8 shows a process for determining a transcription error probability and natural language interpretation error probability using a trained model according to an embodiment of the invention.

Referring now to FIG. 8, a process is shown for determining a transcription error probability or a natural language misinterpretation probability. At step 802, the system reads or receives a first transcription for a first query. At step 804, a first end time is recorded or identified for the first query. At step 806, a second transcription is read for a second query at a second time. At step 808, the system calculates an edit distance between the first transcription and the second transcription. At step 810, the system calculates a first sentiment vector for the first transcription. At step 812, the system calculates a second sentiment vector for the second transcription. At step 814, the system determines or calculates a vector distance between the first sentiment vector and the second sentiment vector. At step 816, the system computes a transcription error probability and a natural language misinterpretation probability using a trained model. The transcription error probability and the natural language misinterpretation probability, for any query, represent the error profile for that query.

In accordance with the various aspects and embodiments of the invention, the QRS system generates an error profile for various queries. The error profiles vary between types of devices (near-field, far-field, or automotive), usage conditions (background noise profiles), user attributes (gender, accent), etc. The error profile includes an error score that is computed. In accordance with some aspects of the invention, the error is computed by aggregating any number of error indicators. In accordance with one aspect, aggregating is to use a normalized weighting of error indicators.

In accordance with one aspect of the invention, the QRS aggregates for instances when the transcriptions of two or more queries, which are within a short time range, are similar according to a string-matching measure, such as edit distance. In accordance with one aspect of the invention, the QRS aggregates when transcriptions are non-identical and the interpretations of two or more queries, within a short time range, are similar, according to a semantic similarity measure. For example, semantic similarity can be based on a distance between embedding vectors. The vector for a transcription can be the sum or the average of the word embedding vectors of the words in the transcription. For example, "How's the weather in Silicon Valley" and "Tell me the temperature in Santa Clara" have close semantic similarity even though they have no words in common.

In accordance with one aspect of the invention, the QRS aggregates for queries that are successfully interpreted, when intents are similar; specifically, when the data in the respective interpretation data structures (e.g. JSON representations) indicate a semantic similarity.

In accordance with one aspect of the invention, the QRS aggregates when a new query interrupts or barges in during a response, which is from the QRS, to the previous query because this can indicate an error in the QRS's transcription of the previous query. Barge-in can be detected by the QRS or device or client. Barge-in can also be inferred by a server when the inter-query time is less than the length of the response audio.

In accordance with one aspect of the invention, the QRS looks for key phrases (e.g. "No" or "not" or "I meant"), which can indicate an error in the response to prior query and, thus, an error in the transcription or interpretation. Some key phrases are stronger indicators of mistranscriptions and some key phrases are stronger indicators of misinterpretations.

In accordance with one aspect of the invention, the QRS detects when a text query, following a recent audio query, has a short edit distance with the audio query transcription. The text query provides a high-accuracy correction for the response that was inaccurate or incorrect. This is because users can see and correct the text that they write before submitting it as a query.

In accordance with one aspect of the invention, the QRS aggregates when two or more queries with a short phrase edit distance have large prosody deltas or when the second query includes a much stronger emphasis, loudness, tone, or word duration. Also, total query length can indicate an attempt at correction.

In accordance with one aspect of the invention, the QRS aggregates when all but a small number of tokens in a query match tokens in a grammar, when there is a low acoustic model score, a language model score, a grammar parse score, etc.

In accordance with one aspect of the invention, an error likelihood score is per-query. In accordance with one aspect of the invention, an error likelihood score is per token. Using finer granularity is more computationally expensive and provides greater precision, which is useful to identify specifically where a transcription has an error. Thus, the ability of the QRS to perform query error detection helps identify real-time system problems and correct the problems for a better user experience.

In accordance with the various aspects of the invention, queries with large error likelihood scores are used to identify queries of interest to improve the design and training of speech models. Thus, a QRS that includes a filtering system, which is using large error likelihood score queries, that detects errors saves a lot of time in providing quality assurance based on query-response data from the field. Furthermore, detected errors can indicate valid pronunciations missing from an ASR phonetic dictionary. The correction process can be used for data analysis, data cleansing, and for real-time query rewrites, all of which can enhance user experience. Furthermore, and in accordance with the aspects of the invention, large high-error-likelihood queries can trigger the QRS to initiate a user dialog to seek additional information in order to allow the QRS to automatically correct the error. As noted, text queries from a user, which follows hypothesized erroneously transcribed (or interpreted) speech queries from a user, can provide high-probability corrections prior to providing the response from the QRS.

A system can use a Statistical Language Model (SLM) to replace hypothesized erroneous phrases such as: a full-corpus, full-language SLM; crowd sourced SLM built just from user query data; and a personal SLM built just from single user's query data.

In accordance with some aspects of the invention, a music player that responds to "play X", "play Y", "play Z" should not identify them as errors. Though such requests tend to come more than 30 seconds apart and so won't be labelled as errors, one approach is to ignore hypothesized interpretation errors between queries that hit the same domain within a virtual assistant. However, since doing so would miss correcting an "Austin"-"Boston" transcription error, sequential hitting of the same domain should not be used to ignore hypothesized transcription errors.

A replacement phrase can be a weighted combination of the SLM probability score for candidate replacement phrases and phonetic closeness score between the hypothesized erroneous phrase (or its highest scoring phonetic hypothesis before language model rescoring) and candidate replacement phrases.

In accordance with some embodiments of the invention, the phonetic comparison can use a master table of tokens with phonetic closeness compiled by analyzing a phonetic dictionary. In accordance with some aspects of the invention, the phonetic comparison can use a table manually curated from detected errors. In accordance with some aspects of the invention, the system can automatically build a table from automatically detected replacements with high correctness scores.

As noted, acoustic features and prosody can be used to improve accuracy of detection of errors that lead to correction of incorrect transcriptions or inaccurate interpretations.

In accordance with an embodiment of the invention, a grammar describes phrasings of utterance or captured speech that are made up of words. As used herein, a "word" is defined relative to any spoken language and can be represented in written form using characters or letter based on any writing system, including an alphabetical writing system. For example, an English spoken word may be represented using an alphabetical writing system. In accordance with another embodiment of the invention, a Chinese spoken word may be represented by Chinese characters. In accordance with another embodiment of the invention, the word may be spoken in Arabic and the Arabic sounds are represented by alphabetical letters. Any combination of spoken words and visual representation of the spoken word may be used.

Figure 9:
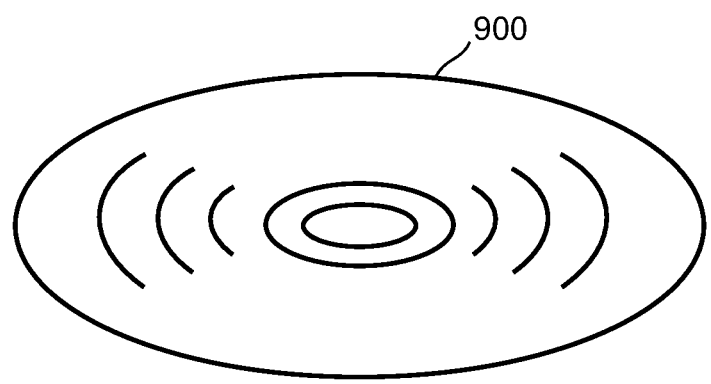
FIG. 9 shows a rotating disk non-transitory computer readable medium according to an embodiment of the invention.

Referring now to FIG. 9, a non-transitory computer readable medium 900 that is a rotating magnetic disk is shown. Data centers commonly use magnetic disks to store code and data for servers. The non-transitory computer readable medium 900 stores code that, if executed by one or more computers, would cause the computer to perform steps of methods described herein. Rotating optical disks and other mechanically moving storage media are possible.

Figure 10:
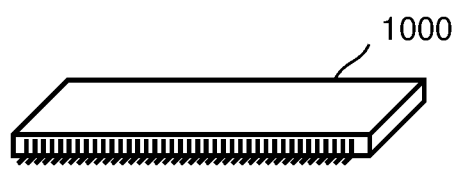
FIG. 10 shows Flash RAM chip non-transitory computer readable medium according to an embodiment of the invention.

Referring now to FIG. 10, an example non-transitory computer readable medium 1000 that is a Flash random access memory (RAM) chip is shown. Data centers commonly use Flash memory to store code and data for servers. Mobile devices commonly use Flash memory to store code and data for system-on-chip devices. The non-transitory computer readable medium 1000 stores code that, if executed by one or more computers, would cause the computer to perform steps of methods described herein. Other non-moving storage media packaged with leads or solder balls are possible. Any type of computer-readable medium is appropriate for storing code according to various embodiments of the invention.

Figure 11:
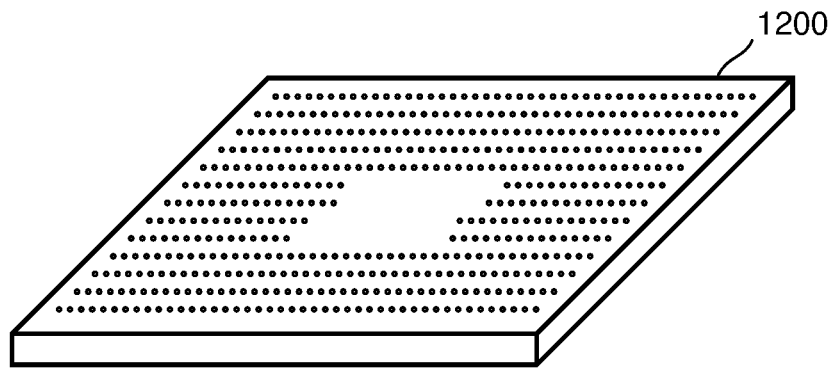
FIG. 11 shows a packaged system-on-chip according to an embodiment of the invention.

Referring now to FIG. 11, the bottom side of a packaged system-on-chip (SoC) device 1200 with a ball grid array for surface-mount soldering to a printed circuit board. Various package shapes and sizes are possible for various chip implementations. SoC devices control many embedded systems and IoT device embodiments as described herein.

Figure 12:
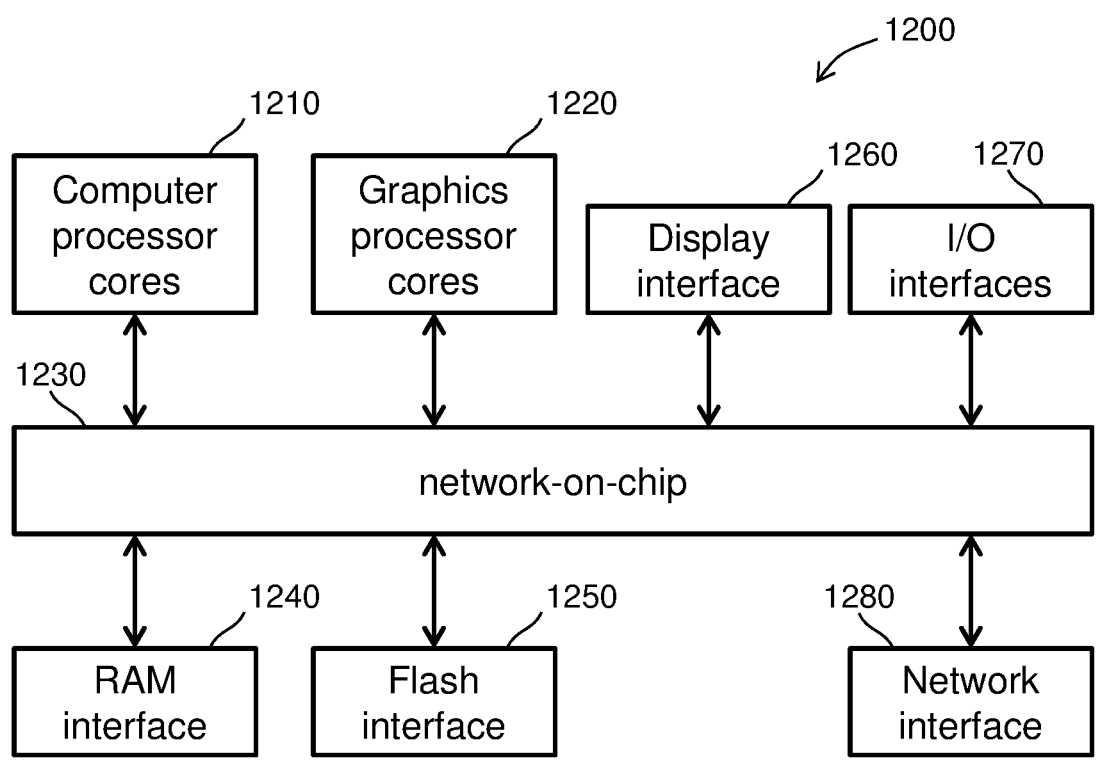
FIG. 12 shows a block diagram of a system-on-chip according to an embodiment of the invention.

Referring now to FIG. 12, a block diagram of the SoC 1200 of FIG. 11 is shown. The SoC device 1200 comprises a multicore cluster of computer processor (CPU) cores 1210 and a multicore cluster of graphics processor (GPU) cores 1220. The processors 1210 and 1220 connect through a network-on-chip 1230 to an off-chip dynamic random access memory (DRAM) interface 1240 for volatile program and data storage and a Flash interface 1250 for non-volatile storage of computer program code in a Flash RAM non-transitory computer readable medium. The SoC device 1200 also has a display interface 1260 for displaying a GUI and an I/O interface module 1270 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. The SoC device 1200 also comprises a network interface 1280 to allow the processors 1210 and 1220 to access the Internet through wired or wireless connections such as Wi-Fi, 3G, 4G long-term evolution (LTE), 5G, and other wireless interface standard radios as well as ethernet connection hardware. By executing instructions stored in RAM devices through interface 1240 or Flash devices through interface 1250, the CPUs 1210 and GPUs 1220 perform steps of methods as described herein.

Figure 13A:
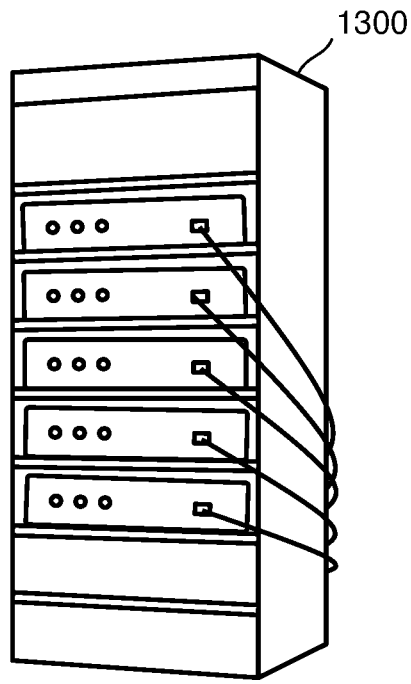
FIG. 13A shows a rack-based server according to an embodiment.

Referring now to FIG. 13A, a rack-mounted server blade multi-processor server system 1300 according to some embodiments is shown. the system 1300 comprises a multiplicity of network-connected computer processors that run software in parallel.

Figure 13B:
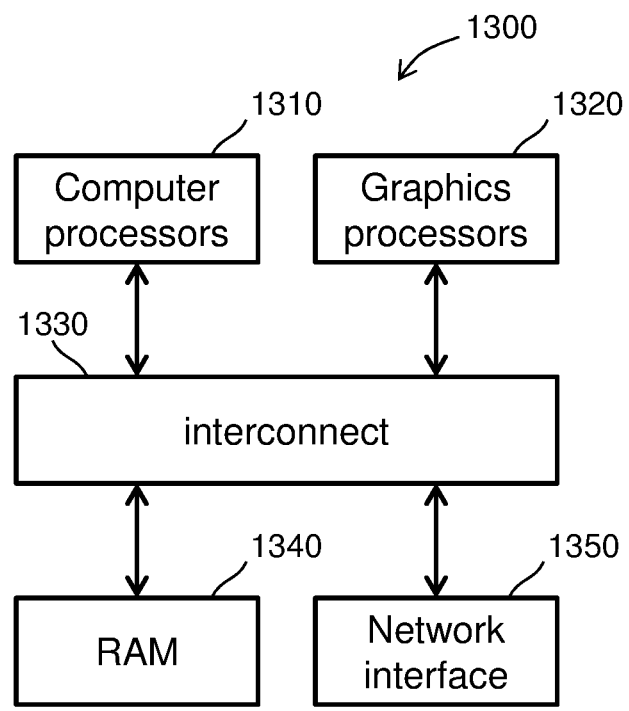
FIG. 13B shows a block diagram of a server according to an embodiment of the invention.

Referring now to FIG. 13B, a block diagram of the server system 1300 of FIG. 13A is shown. The server system 1300 includes a multicore cluster of CPU cores 1310 and a multicore cluster of GPU cores 1320. The processors connect through a board-level interconnect 1330 to random-access memory (RAM) devices 1340 for program code and data storage. Server system 1300 also comprises a network interface 1350 to allow the processors to access the Internet. By executing instructions stored in RAM device 1340, the CPUs 1310 and GPUs 1320 perform steps of methods as described herein.

Figure 14:
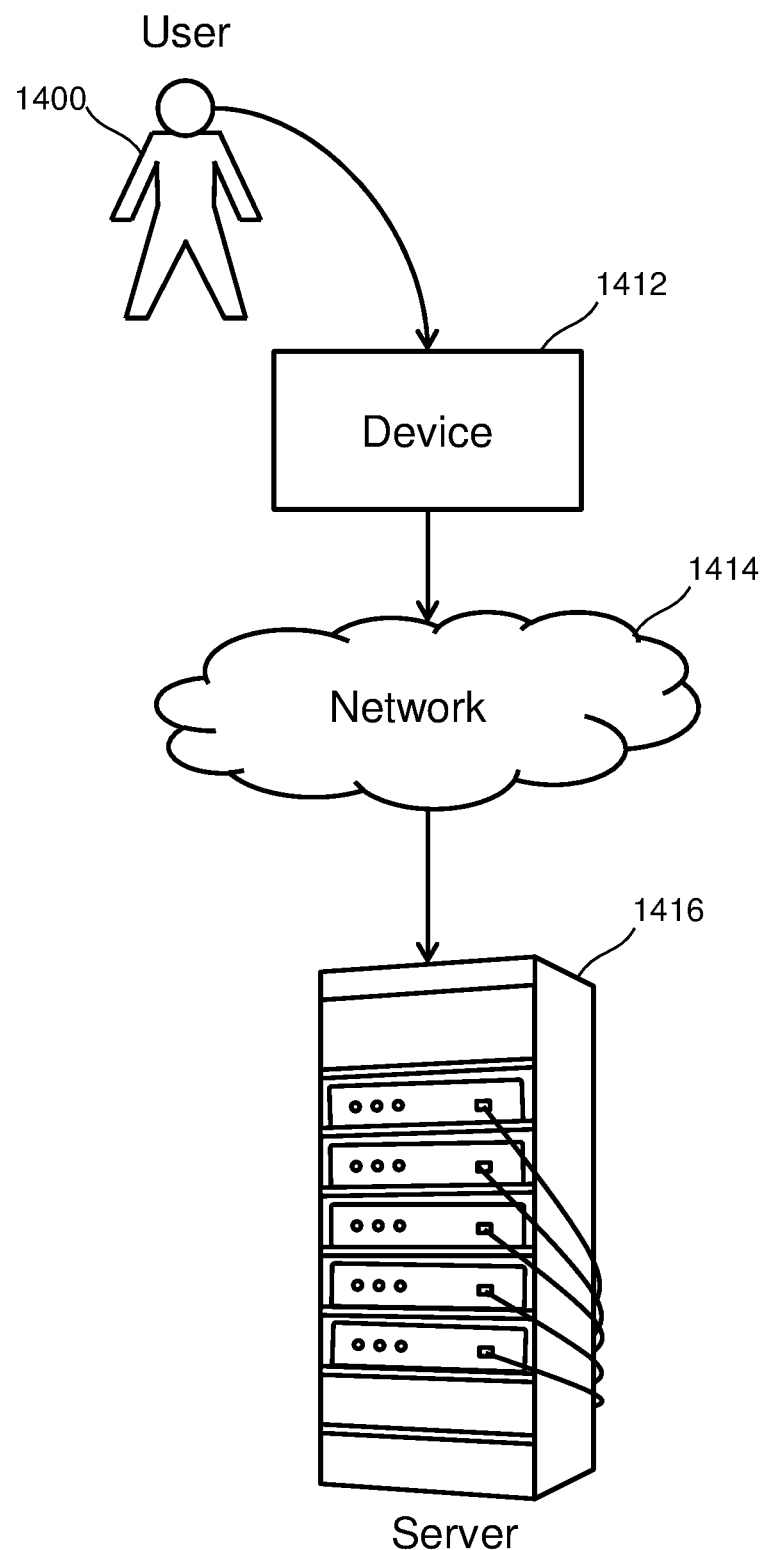
FIG. 14 illustrates a virtual assistant system that uses client-server coupling according to an embodiment of the invention.

Some embodiments run entirely on a user device. Some embodiments use client-server interaction for reasons such as the server having more processor performance in order to give better quality of results. FIG. 14 shows one such embodiment. A user 1400 speaks audio to a virtual assistant or device 1412, which sends the audio over a network 1414 to a rack-mounted server 1416 in the server farm of a data center. The server 1416 processes the audio and carries out method steps as outline in the various aspects and embodiment of the invention. The server 1416 sends the result through network 1414 to device 1412, which provides it to user 1400. In response, user 1400 speaks and the device 1412 receives and sends the captured speech of the user 1400 over network 1414 to server 1416. The server 1416 carries out method steps in accordance with the various aspects of the invention.

Modern virtual assistants work by executing software on computer processors. Various embodiments store software for such processors as compiled machine code or interpreted code on non-transitory computer readable media.

Various embodiments use general purpose processors with instruction sets such as the x86 instruction set, graphics processors, embedded processors such as ones in systems-on-chip with instruction sets such as the ARM instruction set, and application-specific processors embedded in field programmable gate array chips.

Various embodiments are methods that use the behavior of either or a combination of humans and machines. The behavior of either or a combination of humans and machines (instructions that, when executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention. Method embodiments are complete wherever in the world most constituent steps occur. Some embodiments are one or more non-transitory computer readable media arranged to store such instructions for methods described herein. Whatever entity holds non-transitory computer readable media comprising most of the necessary code holds a complete embodiment. Some embodiments are physical devices such as semiconductor chips; hardware description language representations of the logical or functional behavior of such devices; and one or more non-transitory computer readable media arranged to store such hardware description language representations. The term "module" as used herein may refer to one or more circuits, components, registers, processors, software subroutines, or any combination thereof.

Although the invention has been shown and described with respect to a certain preferred embodiment or embodiments, it is obvious that equivalent alterations and modifications will occur to others skilled in the art upon the reading and understanding of this specification and the drawings. Practitioners skilled in the art will recognize many modifications and variations. The modifications and variations include any relevant combination of the disclosed features. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature may have been disclosed with respect to only one of several embodiments, such feature may be combined with one or more other features of the other embodiments as may be desired and advantageous for any given or particular application.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

In accordance with the teachings of the invention, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

An article of manufacture or system, in accordance with an embodiment of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" have an effectual relationship realizable by a direct connection or indirect connection, which uses one or more other intervening elements. Elements described herein as "communicating" or "in communication with" other elements include any form of communication or link. For example, a communication link may be established using a wired connection, 802.11 wireless protocols, near-filed protocols, or RFID.

As used herein the term "application" or "app" includes anything that an end-user purchases and deploys or uses in their home or workplace. An application includes anything that incorporates the ability to communicate, by receiving and sending information, with other applications. An application may be a device, which is an object that can establish a communication link or connection with another system or device. An application may also be an object that is coupled with a device. In accordance with an embodiment, applications include an identification or ID. Examples of different types of ID includes a bar code or a set of numbers or anything that can uniquely identify and distinguish either the specific embodiment of the application or its type from other applications.

The scope of the invention, therefore, is not intended to be limited to the exemplary embodiments shown and described herein. Rather, the scope and spirit of present invention is embodied by the appended claims.

What is claimed is:

1. A virtual assistant comprising a trained neural network model, wherein training the model uses queries presented in a short period of time to detect an error and learn to correct the error, for natural language processing to identify errors for a query presented in a natural language form, wherein the virtual assistant calculates a vector distance between a first sentiment vector and a second sentiment vector and computes a transcription error probability and a natural language understanding misinterpretation probability using the trained neural network model, and wherein the transcription error probability and the natural language understanding misinterpretation probability represent an error profile for the query, probabilities being related to the vector distance and inversely related to an edit distance, and the transcription error probability exceeds the natural language understanding misinterpretation probability for large vector distances.

2. A computer-implemented method comprising:
receiving a natural language query and transcribing it into a first word sequence;
using a statistical model, wherein training the model includes using natural language expressions identified as errors, on words within the first word sequence to compute corresponding error probabilities that the words are errors;
deriving a second word sequence having a replacement phrase for a word with a corresponding error probability above a threshold, the replacement phrase having a lower error probability and the replacement phrase is derived from a phonetic closeness score between a candidate replacement phrase and a hypothesized erroneous phrase; and
transmitting a virtual assistant query response depending on the replacement phrase.

3. The method of claim 2 further comprising receiving acoustic model scores for words within the first word sequence, wherein the corresponding error probability is inversely related to the acoustic model score.

4. The method of claim 2 further comprising computing a sentiment vector from the replacement phrase, wherein the virtual assistant query response depends on the sentiment vector.

5. The method of claim 2 further comprising:
computing a sentiment vector from the replacement phrase;
computing the distance between the computed sentiment vector and a sentiment vector from a previous natural language query; and
determining the virtual assistant query response based on the distance being below a threshold.

6. The method of claim 2 further comprising computing an error score by aggregating a plurality of error indicators.

7. The method of claim 6 further comprising normalizing weighting of error indicators using the error score.

* * * * *